United States Patent
Mitsui

(10) Patent No.: US 11,584,832 B2
(45) Date of Patent: Feb. 21, 2023

(54) METHOD FOR PRODUCING RUBBER WET MASTERBATCH AND METHOD FOR PRODUCING RUBBER COMPOSITION

(71) Applicant: Toyo Tire Corporation, Itami (JP)

(72) Inventor: Akihito Mitsui, Itami (JP)

(73) Assignee: Toyo Tire Corporation, Itami (JP)

( * ) Notice: Subject to any disclaimer, the term of this patent is extended or adjusted under 35 U.S.C. 154(b) by 246 days.

(21) Appl. No.: 17/132,438

(22) Filed: Dec. 23, 2020

(65) Prior Publication Data

US 2021/0198436 A1     Jul. 1, 2021

(30) Foreign Application Priority Data

Dec. 26, 2019     (JP) .............................. JP2019-236009

(51) Int. Cl.
  *C08J 3/22*     (2006.01)
  *C08K 3/04*     (2006.01)
  *C08L 7/02*     (2006.01)

(52) U.S. Cl.
  CPC     *C08J 3/22* (2013.01); *C08K 3/04* (2013.01); *C08L 7/02* (2013.01)

(58) Field of Classification Search
  CPC ..... C08J 3/22; C08J 3/203; C08J 3/215; C08J 2307/02; C08J 3/226; C08K 3/04; C08L 7/02; C08L 7/00
  USPC ....................................................... 523/351
  See application file for complete search history.

(56) References Cited

U.S. PATENT DOCUMENTS

2021/0198448 A1*   7/2021   Konno .................... C08K 3/04
2021/0230380 A1*   7/2021   Inada ..................... C08K 3/04

FOREIGN PATENT DOCUMENTS

| JP | 2019-104859 A | 6/2019 |
| JP | 2019-104860 A | 6/2019 |
| JP | 2019-112542 A | 7/2019 |
| JP | 2019-112543 A | 7/2019 |
| JP | 2019-112545 A | 7/2019 |
| JP | 2019-112586 A | 7/2019 |

* cited by examiner

*Primary Examiner* — Hannah J Pak
(74) *Attorney, Agent, or Firm* — WHDA, LLP

(57) ABSTRACT

A method for producing a rubber wet masterbatch, the method including: adding a rubber latex solution to a carbon black-containing slurry aqueous solution in which a carbon black is dispersed in water and mixing the solutions to produce a carbon black-containing rubber latex aqueous solution; coagulating the carbon black-containing rubber latex aqueous solution obtained to produce a carbon black-containing rubber coagulum; cleaning the carbon black-containing rubber coagulum obtained to produce a cleaned carbon black-containing rubber coagulum; and dehydrating and drying the cleaned carbon black-containing rubber coagulum obtained to produce a rubber wet masterbatch, wherein an amount of an acetone extract from the cleaned carbon black-containing rubber coagulum is 2% by mass or less after drying the coagulum at 23° C. for 24 hours and further at 90° C. for 2 hours. Vulcanized rubber having excellent low exothermicity and excellent abrasion resistance can be obtained by the method.

2 Claims, No Drawings

METHOD FOR PRODUCING RUBBER WET MASTERBATCH AND METHOD FOR PRODUCING RUBBER COMPOSITION

BACKGROUND OF THE INVENTION

Field of the Invention

The present invention relates to a method for producing a rubber wet masterbatch and a method for producing a rubber composition.

Description of the Related Art

It has been conventionally known in the rubber industry that a rubber wet masterbatch is used for improvement in the processability during the production of a rubber composition containing a carbon black and the dispersibility of a carbon black. In this method, a carbon black is mixed with a dispersion solvent in advance at a certain ratio and dispersed in the dispersion solvent by a mechanical force to obtain a carbon black-containing slurry solution, the carbon black-containing slurry solution is mixed with a rubber latex solution in a liquid phase, then, a coagulant such as an acid is added to obtain a coagulum (carbon black-containing rubber coagulum), and the coagulum is collected and dried (for example, Patent Documents 1 to 6).

In the case of using a rubber wet masterbatch, the dispersibility of the carbon black is more excellent and the obtained rubber composition is more excellent in rubber physical properties such as processability and a reinforcing property than in the case of using a rubber dry masterbatch obtained by mixing a carbon black and rubber in a solid phase. By using such a rubber composition as a raw material, it is possible to produce a rubber product (vulcanized rubber) such as a pneumatic tire having reduced rolling resistance and excellent fatigue resistance.

PRIOR ART DOCUMENT

Patent Document

Patent Document 1: JP-A-2019-112586
Patent Document 2: JP-A-2019-112545
Patent Document 3: JP-A-2019-112543
Patent Document 4: JP-A-2019-112542
Patent Document 5: JP-A-2019-104860
Patent Document 6: JP-A-2019-104859

SUMMARY OF THE INVENTION

In the market, tires (vulcanized rubber) in which a rubber composition is used as a raw material need to be further low exothermic and to have abrasion resistance.

The present invention has been made in view of the above-described circumstances, and provides a method for producing a rubber wet masterbatch with which vulcanized rubber having excellent low exothermicity and excellent abrasion resistance is obtained.

The present invention relates to a method for producing a rubber wet masterbatch, the method including: a step (I) of adding a rubber latex solution to a carbon black-containing slurry aqueous solution in which a carbon black is dispersed in water and mixing the rubber latex solution and the carbon black-containing slurry aqueous solution to produce a carbon black-containing rubber latex aqueous solution; a step (II) of coagulating the carbon black-containing rubber latex aqueous solution obtained to produce a carbon black-containing rubber coagulum; a step (III) of cleaning the carbon black-containing rubber coagulum obtained to produce a cleaned carbon black-containing rubber coagulum; and a step (IV) of dehydrating and drying the cleaned carbon black-containing rubber coagulum obtained to produce a rubber wet masterbatch, wherein an amount of an acetone extract from the cleaned carbon black-containing rubber coagulum is 2% by mass or less after drying the cleaned carbon black-containing rubber coagulum at 23° C. for 24 hours and further at 90° C. for 2 hours.

Furthermore, the present invention relates to a method for producing a rubber composition, the method including a step (V) of dry mixing in which the rubber wet masterbatch obtained by the method for producing a rubber wet masterbatch is used.

Regarding the action mechanism of the effect in the method for producing a rubber wet masterbatch according to the present invention, some of the details are unknown and presumed as follows. However, the present invention does not need to be interpreted as being limited to this action mechanism.

The method for producing a rubber wet masterbatch according to the present invention includes: a step (I) of adding a rubber latex solution to a carbon black-containing slurry aqueous solution in which a carbon black is dispersed in water and mixing the rubber latex solution and the carbon black-containing slurry aqueous solution to produce a carbon black-containing rubber latex aqueous solution; a step (II) of coagulating the carbon black-containing rubber latex aqueous solution obtained to produce a carbon black-containing rubber coagulum; a step (III) of cleaning the carbon black-containing rubber coagulum obtained to produce a cleaned carbon black-containing rubber coagulum; and a step (IV) of dehydrating and drying the cleaned carbon black-containing rubber coagulum obtained to produce a rubber wet masterbatch, wherein an amount of an acetone extract from the cleaned carbon black-containing rubber coagulum is 2% by mass or less after drying the cleaned carbon black-containing rubber coagulum at 23° C. for 24 hours and further at 90° C. for 2 hours. It has been suggested to clean a carbon black-containing rubber coagulum by water washing or the like as in Patent Documents described above, but a specific method and degree of cleaning have not been disclosed. In the method for producing a rubber wet masterbatch according to the present invention, impurities in the carbon black-containing rubber coagulum can be removed by setting the amount of the acetone extract in the cleaned carbon black-containing rubber coagulum to a certain level or less as described above. It is presumed that owing to this fact, the vulcanized rubber in which the rubber wet master batch obtained by dehydrating and drying the rubber coagulum is used exhibits low exothermicity and abrasion resistance in a well-balanced manner.

DETAILED DESCRIPTION OF THE PREFERRED EMBODIMENTS

<Method for Producing Rubber Wet Masterbatch>

The method for producing a rubber wet masterbatch according to the present invention includes: a step (I) of adding a rubber latex solution to a carbon black-containing slurry aqueous solution in which a carbon black is dispersed in water and mixing the rubber latex solution and the carbon black-containing slurry aqueous solution to produce a carbon black-containing rubber latex aqueous solution; a step (II) of coagulating the carbon black-containing rubber latex aqueous solution obtained to produce a carbon black-containing rubber coagulum; a step (III) of cleaning the carbon black-containing rubber coagulum obtained to produce a cleaned carbon black-containing rubber coagulum; and a step (IV) of dehydrating and drying the cleaned carbon black-containing rubber coagulum obtained to produce a rubber wet masterbatch, wherein an amount of an acetone extract from the cleaned carbon black-containing rubber coagulum is 2% by mass or less after drying the cleaned carbon black-containing rubber coagulum at 23° C. for 24 hours and further at 90° C. for 2 hours.

<Step (I)>

In the step (I) of the present invention, a rubber latex solution is added to a carbon black-containing slurry aqueous solution in which a carbon black is dispersed in water, and the rubber latex solution and the carbon black-containing slurry aqueous solution are mixed to produce a carbon black-containing rubber latex aqueous solution.

<Carbon Black-Containing Slurry Aqueous Solution>

The carbon black-containing slurry aqueous solution is usually obtained by mixing a carbon black and water as raw materials. When the carbon black is mixed with water, at least a part of the rubber latex solution described below may be added from the viewpoint of improving the dispersibility of the carbon black.

As the carbon black, for example, a carbon black used in the ordinary rubber industry can be used, such as SAF, ISAF, HAF, FEF, or GPF. In addition, a conductive carbon black such as acetylene black or Ketjen black can be used. The carbon black may be a granulated carbon black granulated in consideration of its handleability in the ordinary rubber industry, or may be a non-granulated carbon black. The carbon blacks may be used singly or in combination of two or more kinds thereof.

The carbon black preferably has a specific surface area by nitrogen adsorption of about 30 $m^2/g$ or more and 250 $m^2/g$ or less, and more preferably about 50 $m^2/g$ or more and 200 $m^2/g$ or less.

The water is a medium containing water such as ion-exchanged water, distilled water, or industrial water as a main component, and may be, for example, water containing an organic solvent.

Examples of the method of mixing the carbon black and the water include a method of dispersing a carbon black using a general disperser such as a high shear mixer, a high shear mixer, a homomixer, a ball mill, a bead mill, a high-pressure homogenizer, an ultrasonic homogenizer, or a colloid mill. If necessary, the entire mixing system such as a disperser may be heated during mixing.

The term "high shear mixer" refers to a mixer having a rotor that is capable of high-speed rotation and a stator that is fixed. In the mixer, the rotation of the rotor with precise clearance between the rotor and the stator generates high shearing action. As such a high shear mixer, commercially available products can be used, such as "High Shear Mixer" manufactured by SILVERSON, "High Shear Mixer IKA 2000 Series" manufactured by IKA, "T.K. HOMO MIXER" manufactured by Tokushu Kika Kogyo Co., Ltd., "Ultra Homo Mixer" manufactured by MIZUHO INDUSTRIAL CO., LTD., "CLEARMIX" manufactured by M Technique Co., Ltd., and "CAVITRON" manufactured by Pacific Machinery & Engineering Co., Ltd.

The rate of the carbon black in the carbon black-containing slurry aqueous solution is preferably 1 to 20% by mass. The rate of the carbon black in the carbon black-containing slurry aqueous solution is more preferably 2% by mass or more, and still more preferably 5% by mass or more, from the viewpoint of enhancing the work efficiency of removing water in the step of dehydrating and drying. The rate of the carbon black in the carbon black-containing slurry aqueous solution is more preferably 15% by mass or less, and still more preferably 12% by mass or less, from the viewpoint of reducing the viscosity of the carbon black-containing slurry aqueous solution to enhance the stirring efficiency.

<Rubber Latex Solution>

As the rubber latex solution, a natural rubber latex solution and a synthetic rubber latex solution can be used.

The natural rubber latex solution is a natural product due to the metabolic action of a plant, and is particularly preferably a natural rubber/water-based solution containing water as a dispersion solvent. The number average molecular weight of the natural rubber contained in the natural rubber latex is preferably 2,000,000 or more, and more preferably 2,500,000 or more. In the natural rubber latex solution, latex such as concentrated latex and fresh latex called field latex can be used without distinction. Examples of the synthetic rubber latex solution include solutions produced by emulsion polymerization of styrene-butadiene rubber, butadiene rubber, nitrile rubber, and chloroprene rubber. The rubber latex solutions may be used singly or in combination of two or more kinds thereof.

The rate of the rubber component (solid content) in the rubber latex solution is preferably 15 to 35% by mass. The rate of the rubber component (solid content) in the rubber latex solution is more preferably 18% by mass or more, and still more preferably 20% by mass or more, from the viewpoint of the reactivity between the carbon black and the rubber content in the latex. The rate of the rubber component (solid content) in the rubber latex solution is more preferably 33% by mass or less, and still more preferably 30% by mass or less, from the viewpoint of preventing a decrease in stirring efficiency due to the high viscosity.

The content of the carbon black is preferably 10 to 120 parts by mass per 100 parts by mass of the rubber component in the rubber latex. The content of the carbon black is preferably 20 parts by mass or more, more preferably 30 parts by mass or more, and preferably 100 parts by mass or less, more preferably 80 parts by mass or less per 100 parts by mass of the rubber component in the rubber latex, from the viewpoint of improving the reinforcing property of the vulcanized rubber.

<Step (II)>

In the step (II) of the present invention, the carbon black-containing rubber latex aqueous solution obtained above is coagulated to produce a carbon black-containing rubber coagulum.

In one example of the coagulation method, the carbon black-containing rubber latex aqueous solution contains a coagulant. As the coagulant, a coagulant usually used for coagulation of a rubber latex solution can be used. Examples of the coagulant include acids such as formic acid and sulfuric acid; and bases such as sodium chloride.

<Step (III)>

In the step (III) of the present invention, the carbon black-containing rubber coagulum obtained above is cleaned to produce a cleaned carbon black-containing rubber coagulum.

The amount of the acetone extract from the cleaned carbon black-containing rubber coagulum is 2% by mass or less after drying the cleaned carbon black-containing rubber coagulum at 23° C. for 24 hours and further at 90° C. for 2 hours. Because acetone can extract impurities contained in the carbon black-containing rubber coagulum (for example, high molecular weight compounds such as proteins and low molecular weight compounds such as fatty acid compounds contained in the rubber latex solution), acetone can be an index for quantifying the impurities (see, for example, JP-A-2003-40902 and JP-A-2012-241066). The amount of the acetone extract from the cleaned carbon black-containing rubber coagulum is preferably 1.8% by mass or less, and more preferably 1.6% by mass or less from the viewpoint of improving the low exothermicity and the abrasion resistance. The smaller the amount of the acetone extract is, the more preferable the cleaned carbon black-containing rubber coagulum is, but from the viewpoint of the productivity of the rubber wet masterbatch, the lower limit is, for example, 1.2% by mass or more or 1.0% by mass or more.

In the step (III), the method of cleaning is not particularly limited as long as the amount of the acetone extract can be adjusted to 2% by mass or less, and examples of the method include methods in which a medium containing water as a main component is used, such as an immersion cleaning method, a spray cleaning method, a shower cleaning method, a swing cleaning method, and an ultrasonic cleaning method. In the cleaning, the degree of cleaning may be enhanced by generating a flow of the medium physically or replacing the medium. Among these methods, the immersion cleaning method is preferable from the viewpoint of cleaning efficiency and ease of equipment introduction. In the method of cleaning, the treatment conditions need to be appropriately set. For example, the treatment temperature is about 25 to 35° C., and the treatment time is 1 to 20 minutes. The cleaning may be performed once or two or more times.

<Step (IV)>

In the step (IV) of the present invention, the cleaned carbon black-containing rubber coagulum obtained above is dehydrated and dried to produce a rubber wet masterbatch. In the method of dehydrating and drying, various dehydration/drying devices can be used, such as a single-screw extruder, a twin-screw extruder, an oven, a conveyor dryer, a vacuum dryer, and an air dryer. If necessary, prior to the step (IV), a step may be provided, such as a centrifugation step or a solid-liquid separation step in which a vibration screen is used, for the purpose of appropriately reducing the amount of water contained in the carbon black-containing rubber coagulum.

<Step (V)>

The method for producing a rubber composition according to the present invention includes a step (V) of dry mixing in which the rubber wet masterbatch obtained above is used.

In the step (V), various compounding agents can be further used. For example, compounding agents for ordinary use in the rubber industry can be used, such as rubber, sulfur-based vulcanizing agents, vulcanization accelerators, anti-aging agents, silica, silane coupling agents, zinc oxide, methylene acceptors and methylene donors, stearic acid, vulcanization activators, vulcanization retarders, organic peroxides, softeners such as waxes and oils, and processing aids. If necessary, the various compounding agents can also be used for production of the rubber wet masterbatch.

The above-described rubber is used separately from the rubber component derived from the rubber wet masterbatch. Examples of the rubber include natural rubber (NR) and diene-based synthetic rubber such as isoprene rubber (IR), styrene-butadiene rubber (SBR), butadiene rubber (BR), chloroprene rubber (CR), and nitrile rubber (NBR). The rubber may be used singly or in combination of two or more kinds thereof.

The content of the carbon black is preferably 10 to 120 parts by mass per 100 parts by mass of the rubber component in the rubber composition. The content of the carbon black is preferably 20 parts by mass or more, more preferably 30 parts by mass or more, and preferably 100 parts by mass or less, more preferably 80 parts by mass or less per 100 parts by mass of the rubber component in the rubber composition, from the viewpoint of improving the reinforcing property of the vulcanized rubber.

The sulfur as the sulfur-based vulcanizing agent may be ordinary sulfur for rubber, and sulfur such as powdered sulfur, precipitated sulfur, insoluble sulfur, and highly dispersible sulfur can be used. The sulfur-based vulcanizing agents may be used singly or in combination of two or more kinds thereof.

The content of the sulfur is preferably 0.3 to 6.5 parts by mass per 100 parts by mass of the rubber component in the rubber composition. If the content of the sulfur is less than 0.3 parts by mass, the crosslink density of the vulcanized rubber is insufficient and the rubber strength or the like is deteriorated. If the content is more than 6.5 parts by mass, both the heat resistance and the durability are particularly deteriorated. In order to ensure good rubber strength of the vulcanized rubber and further improve the heat resistance and the durability, the content of the sulfur is preferably 1.0 to 5.5 parts by mass per 100 parts by mass of the rubber component in the rubber composition.

An ordinary vulcanization accelerator for rubber is sufficient as the vulcanization accelerator, and examples of the vulcanization accelerator include sulfenamide-based vulcanization accelerators, thiuram-based vulcanization accelerators, thiazole-based vulcanization accelerators, thiourea-based vulcanization accelerators, guanidine-based vulcanization accelerators, and dithiocarbamate-based vulcanization accelerators. The vulcanization accelerators may be used singly or in combination of two or more kinds thereof.

The content of the vulcanization accelerator is preferably 1 to 5 parts by mass per 100 parts by mass of the rubber component in the rubber composition.

An ordinary anti-aging agent for rubber is sufficient as the anti-aging agent, and examples of the anti-aging agent include aromatic amine-based anti-aging agents, amine-ketone-based anti-aging agents, monophenol-based anti-aging agents, bisphenol-based anti-aging agents, polyphenol-based anti-aging agents, dithiocarbamate-based anti-aging agents, and thiourea-based anti-aging agents. The anti-aging agents may be used singly or in combination of two or more kinds thereof.

The content of the anti-aging agent is preferably 1 to 5 parts by mass per 100 parts by mass of the rubber component in the rubber composition.

In the step (V), the method of blending (adding) the rubber wet masterbatch and the various compounding agents is, for example, a method of kneading with a kneader used in the ordinary rubber industry, such as a Banbury mixer, a kneader, or a roll.

The method of kneading is not particularly limited, and examples of the method include a method of adding and kneading components other than vulcanizing components such as sulfur-based vulcanizing agents and vulcanization accelerators in an arbitrary order, a method of adding and kneading components other than vulcanizing components simultaneously, and a method of adding and kneading all components simultaneously. The number of times of the kneading may be one or more. The kneading time depends on the size of the kneader used, and a time of about 2 to 5 minutes is usually sufficient as the kneading time. The discharge temperature of the kneader is preferably 120 to 170° C., and more preferably 120 to 150° C. In the case where the vulcanizing component is contained, the discharge temperature of the kneader is preferably 80 to 110° C., and more preferably 80 to 100° C.

According to the method for producing a rubber wet masterbatch or the method for producing a rubber composition of the present invention, vulcanized rubber having excellent low exothermicity and excellent abrasion resistance can be obtained. The rubber wet masterbatch and the rubber composition according to the present invention are suitable for a pneumatic tire.

EXAMPLES

The present invention is described below with reference to Examples, but the present invention is not limited to these Examples.

(Raw Materials Used)

a) Natural rubber latex solution: "NR Field Latex" (manufactured by Golden Hope Plantations Berhad) (DRC=31.2%)

b) Carbon Black: "SEAST 3" (manufactured by TOKAI CARBON CO., LTD.)

c) Zinc oxide: "Zinc Oxide Type 2" (manufactured by MITSUI MINING & SMELTING CO., LTD.)

d) Wax: "OZOACE 0355" (manufactured by NIPPON SEIRO CO., LTD.)

e) Stearic acid: "LUNAC S20" (manufactured by Kao Corporation)

f) Anti-aging agent (A): "NOCRAC 6C" (manufactured by OUCHI SHINKO CHEMICAL INDUSTRIAL CO., LTD.)

g) Anti-aging agent (B): "NOCRAC 224" (manufactured by OUCHI SHINKO CHEMICAL INDUSTRIAL CO., LTD.)

h) Sulfur: "Fine Powder Sulfur with 5% Oil" (manufactured by Tsurumi Chemical Industry Co., ltd.)

i) Vulcanization accelerator: "NOCCELER NS-P" (manufactured by OUCHI SHINKO CHEMICAL INDUSTRIAL CO., LTD.)

Example 1

<Step (I): Production of Carbon Black-Containing Rubber Latex Aqueous Solution>

Water was added to the natural rubber latex solution "NR Field Latex" at 25° C. to obtain a dilute natural rubber latex solution having a solid content (rubber) concentration of 0.5% by mass and a natural rubber latex solution having a solid content (rubber) concentration of 25% by mass. A carbon black was added to the dilute natural rubber latex solution so that the solid content (rubber component) was 0.5 parts by mass per 50 parts by mass of the carbon black, and the resulting solution was stirred with a stirrer "FLASHBLEND" manufactured by SILVERSON (3,600 rpm, 30 minutes) to obtain a carbon black-containing slurry aqueous solution to which rubber latex particles were adhered. Subsequently, the rubber latex solution (25% by mass) was added to the carbon black-containing slurry aqueous solution to which rubber latex particles were adhered so that the solid content (total of the rubber components including the above-described rubber component) was 100 parts by mass per 50 parts by mass of the carbon black, and the resulting solution was stirred with a mixer (Super mixer SMV-20) manufactured by KAWATA MFG. CO., LTD. to obtain a carbon black-containing rubber latex aqueous solution.

<Step (II): Production of Carbon Black-Containing Rubber Coagulum>

Next, to the carbon black-containing slurry aqueous solution produced in the step (I), formic acid (10%) was added as a coagulant while the solution was stirred by the mixer until the pH of the entire solution reached 4 to produce a mixture containing a carbon black-containing rubber coagulum and a coagulating liquid.

<Step (III): Production of Cleaned Carbon Black-Containing Rubber Coagulum>

In the mixture containing a carbon black-containing rubber coagulum and a coagulating liquid produced in the step (II), 42% by mass of the total amount of liquids (such as water for dispersion of the slurry, water in the latex, and formic acid) was replaced with water (cleaning water), and immersion cleaning was performed to produce a cleaned carbon black-containing rubber coagulum. When the term "cleaning water replacement rate in immersion cleaning (%)" is defined as the replacement rate with water (cleaning water), the rate in the above case is 42%. In the case of replacing with water two or more times, the cleaning water replacement rate after completion of replacement (%) is defined. For example, in the case of replacing with 24% by mass of water (cleaning water) twice, the replacement rate is 42% (=100%−(100%−24%)^2). Furthermore, about 10 g of the obtained cleaned carbon black-containing rubber coagulum was dried at 23° C. (room temperature) for 24 hours, and further dried at 90° C. for 2 hours using a hot air dryer, then acetone was extracted under the conditions in accordance with JIS K6229, and the amount of the acetone extract (% by mass) was determined from the difference in mass before and after the acetone extraction. Table 1 shows the results.

<Step (IV): Production of Rubber Wet Masterbatch>

The cleaned carbon black-containing rubber coagulum produced in the step (III) was dehydrated and dried with a squeezer type single-screw extrusion dehydrator (screw press No. V-02 manufactured by SUEHIRO EPM CORPORATION) to produce a rubber wet masterbatch.

<Step (V): Production of Rubber Composition and Unvulcanized Rubber Composition>

The rubber wet masterbatch obtained above and raw materials shown in Table 1 (components other than the sulfur and the vulcanization accelerator) were dry-mixed using a Banbury mixer (kneading time: 3 minutes, discharge temperature: 150° C.) to produce a rubber composition. Next, the sulfur and the vulcanization accelerator shown in Table 1 were added to the obtained rubber composition, and the resulting mixture was dry-mixed using a Banbury mixer (kneading time: 1 minute, discharge temperature: 90° C.) to produce an unvulcanized rubber composition. The blending ratio in Table 1 is shown by the mass by part (phr) per 100 parts by mass of the total amount of the rubber components contained in the rubber composition.

Example 2 and Comparative Examples 1 to 2

Rubber wet masterbatches, rubber compositions, and unvulcanized rubber compositions in Example 2 and Comparative Examples 1 to 2 were produced in the same manner as in Example 1 except that in <Step (III): production of cleaned carbon black-containing rubber coagulum> in Example 1, the cleaning water replacement rate in immersion cleaning (%) was changed as shown in Table 1. Table 1 shows the results of the amount of the acetone extract (% by mass) from the cleaned carbon black-containing rubber coagulum in Example 2 and Comparative Examples 1 to 2.

<Production of Vulcanized Rubber>

The unvulcanized rubber compositions obtained in Examples and Comparative Examples described above were vulcanized at 150° C. for 30 minutes to produce vulcanized rubber. The obtained vulcanized rubber was evaluated as follows. Table 1 shows the evaluation results.

<Evaluation of Exothermicity>

For evaluation of exothermicity, measurement was performed using a rheometer E4000 manufactured by UBM under the conditions of a temperature of 60° C., a frequency of 10 Hz, an initial strain of 15%, and a dynamic strain of ±2.5%, and the index based on the value in Comparative Example 1 set to 100 was evaluated. The smaller the index is, the better the low exothermicity is.

<Evaluation of Abrasion Resistance>

The abrasion loss of the test piece of the obtained vulcanized rubber was measured in a Lambourn abrasion test (slip ratio: 30%, load: 40 N, sand falling rate: 20 g/min) in accordance with JIS K6264 to evaluate the abrasion resistance. Table 1 shows the index of the reciprocal of the abrasion loss in each Example based on the value in Comparative Example 1 set to 100. The larger the index is, the better the abrasion resistance is.

|  |  | Comparative Example 2 | Comparative Example 2 | Example 1 | Example 2 |
|---|---|---|---|---|---|
| Steps (I) to (IV) | Rubber latex solution (solid content) | 100 | 100 | 100 | 100 |
|  | Carbon black | 50 | 50 | 50 | 50 |
|  | Cleaning step of carbon black-containing rubber coagulum | Absent | Present | Present | Present |
|  | Cleaning water replacement rate in immersion cleaning | 0% | 15% | 42% | 79% |
|  | Amount of aceton extract (% by mass) | 2.5 | 2.3 | 2 | 1.5 |
| Step (V) | Zinc oxide | 1 | 1 | 1 | 1 |
|  | Stearic acid | 2 | 2 | 2 | 2 |
|  | Wax | 1 | 1 | 1 | 1 |
|  | Anti-aging agent (A) | 2 | 2 | 2 | 2 |
|  | Anti-aging agent (B) | 1 | 1 | 1 | 1 |
|  | Sulfur | 2 | 2 | 2 | 2 |
|  | Vulcanization accelerator | 1 | 1 | 1 | 1 |
| Evaluation | Exothermicity | 100 | 100 | 98 | 97 |
|  | Abrasion resistance | 100 | 102 | 109 | 115 |

What is claimed is:

1. A method for producing a rubber wet masterbatch, the method comprising:
    a step (I) of adding a rubber latex solution to a carbon black-containing slurry aqueous solution in which a carbon black is dispersed in water, and mixing the rubber latex solution and the carbon black-containing slurry aqueous solution to produce a carbon black-containing rubber latex aqueous solution;
    a step (II) of coagulating the carbon black-containing rubber latex aqueous solution obtained to produce a carbon black-containing rubber coagulum;
    a step (III) of cleaning the carbon black-containing rubber coagulum obtained to produce a cleaned carbon black-containing rubber coagulum; and
    a step (IV) of dehydrating and drying the cleaned carbon black-containing rubber coagulum obtained to produce a rubber wet masterbatch,
    wherein an amount of an acetone extract from the cleaned carbon black-containing rubber coagulum is 2% by mass or less and 1% by mass or more after drying the cleaned carbon black-containing rubber coagulum at 23° C. for 24 hours and further at 90° C. for 2 hours.

2. A method for producing a rubber composition, the method comprising a step (V) of dry mixing in which the rubber wet masterbatch obtained by the method for producing a rubber wet masterbatch according to claim 1 is used.

* * * * *